United States Patent
Fisher et al.

(10) Patent No.: US 6,409,464 B1
(45) Date of Patent: Jun. 25, 2002

(54) METHODS AND APPARATUS FOR SUPPLYING OIL TO BEARING ASSEMBLIES

(75) Inventors: Kenneth Lee Fisher, Lockland; Herbert Franz Demel, West Chester; Rodney Hazeley, Cincinnati, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/607,755

(22) Filed: Jun. 30, 2000

(51) Int. Cl.[7] .............................................. F01D 25/16
(52) U.S. Cl. .......................... 415/1; 415/111; 416/174; 384/475
(58) Field of Search ................................ 415/111, 112, 415/175, 176, 229; 416/174; 384/475, 474, 473; 184/6.11, 13.1

(56) References Cited

U.S. PATENT DOCUMENTS

| | | | | |
|---|---|---|---|---|
| 4,265,334 A | | 5/1981 | Benhase, Jr. | |
| 4,334,720 A | * | 6/1982 | Singer | 308/187 |
| 4,648,485 A | * | 3/1987 | Kovaleski | 184/13.1 |
| 4,926,970 A | * | 5/1990 | Kimberlin | 184/6.11 |
| 5,106,209 A | * | 4/1992 | Atkinson et al. | 384/475 |
| 5,272,868 A | * | 12/1993 | Ciokajlo et al. | 60/39.08 |
| 5,311,734 A | | 5/1994 | Pope et al. | |
| 5,480,232 A | | 1/1996 | Lendway | |
| 5,582,413 A | | 12/1996 | Lendway | |
| 5,813,214 A | * | 9/1998 | Moniz et al. | 60/39.08 |

* cited by examiner

*Primary Examiner*—F. Daniel Lopez
*Assistant Examiner*—Richard A. Edgar
(74) *Attorney, Agent, or Firm*—Rodney M. Young; Armstrong Teasdale LLP

(57) ABSTRACT

A gas turbine engine includes a lubrication system that supplies oil through a plurality of circumferential grooves and radial grooves to a bearing assembly. The grooves extend within an inner surface of a first rotor shaft sized to fit in an interference fit around a main rotor shaft. The circumferential grooves are spaced circumferentially around the inner surface of the first rotor shaft and are substantially perpendicular to the radial grooves. The radial grooves are in flow communication with a plurality of scoops extending between an outer and inner surface of the first rotor shaft, and with the bearing assembly.

20 Claims, 4 Drawing Sheets

METHODS AND APPARATUS FOR SUPPLYING OIL TO BEARING ASSEMBLIES

BACKGROUND OF THE INVENTION

This application relates generally to bearing assemblies and, more particularly, to lubrication systems for bearing assemblies.

As turbine engines have evolved, higher stage loading turbo-machinery, including larger bearing assemblies and rotor shafts, have been included within the engines to provide increased pressure ratio cycles for the turbine engines. Higher pressure ratios increase cycle temperatures and air temperatures within the engine. Specifically, higher stage loading causes an operating speed of the turbines to increase, resulting in temperature increases in the rotor and bearing assemblies.

To minimize the effects of increased pressure ratio cycles, known bearing assemblies include lubrication systems that attempt to lubricate the bearing assemblies supporting rotor shafts to reduce wear to the bearing assemblies. The bearing assemblies include a split inner race mounted to a rotor shaft, an outer race, and a bearing element supported therebetween. The lubrication system includes an oil jet to supply oil to the underside of a shaft and a plurality of axial grooves for supplying oil to the bearing assembly. To structurally and physically accommodate the larger diameter areas, the bearing assemblies are often fabricated with larger components.

Other know bearing assemblies include a plurality of blades, the oil scoop, that capture oil and direct it radially, then locally axially to a plurality of axial slots. To ensure each axial slot to be filled receives an adequate amount of oil, the ring has enough axial width for the oil to flow circumferentially and fill the ring fully prior to reaching the axial distribution slot. As a result, all axial slots receive equal amounts of oil.

In cases where there is not adequate axial width of the oil distribution rings, the axial grooves nearest the oil inlet will preferentially collect and transport the oil. As a result, often such lubrication systems do not provide an even distribution to radial grooves that channel the oil to the bearing assemblies and thus, the bearing S assemblies do not receive adequate or complete lubrication. Over time, continued ineffective lubrication may result in increased bearing wear, thus decreasing a useful life of the bearings.

BRIEF SUMMARY OF THE INVENTION

In an exemplary embodiment, a gas turbine engine includes a lubrication system that supplies oil through a plurality of circumferential grooves and a plurality of axial grooves to a bearing assembly. The circumferential and axial grooves extend within an inner surface of a first rotor shaft that is sized to fit with an interference fit around a main rotor shaft. The circumferential grooves are spaced circumferentially around the inner surface of the first rotor shaft and are substantially perpendicular to the axial grooves. The circumferential grooves are in flow communication with a plurality of scoops that extend between an outer surface of the first rotor shaft and the first rotor shaft inner surface. The axial grooves extend from the circumferential grooves and are in flow communication with the bearing assembly.

During operation, lubricating oil supplied to the first rotor shaft is directed radially inward through the rotor shaft scoops. The oil is channeled through the scoops into the plurality of first grooves. The oil then flows circumferentially through the first groove and is dispersed into the plurality of axial grooves to be channeled to the bearing assembly. Because the first groove permits the lubricating oil to initially flow circumferentially, the oil is more evenly distributed to each of the axial grooves. As a result, a bearing assembly is provided that receives an enhanced and even distribution of lubricating oil such that bearing wear is reduced and bearing useful life is extended.

DETAILED DESCRIPTION OF THE INVENTION

Figure 1:
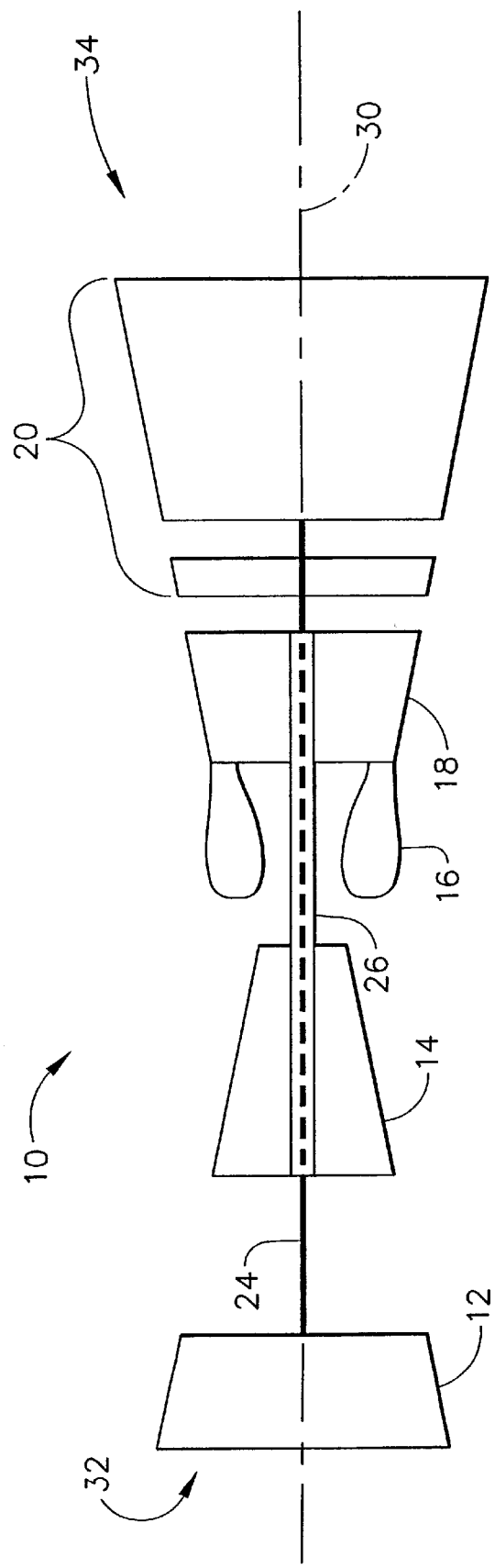
FIG. 1 is schematic illustration of a gas turbine engine including a combustor.

FIG. 1 is a schematic illustration of a gas turbine engine 10 including a low pressure compressor 12, a high pressure compressor 14, and a combustor 16. Engine 10 also includes a high pressure turbine 18, and a low pressure turbine 20. Compressor 12 and turbine 20 are coupled by a first shaft 24, and compressor 14 and turbine 18 are coupled by a second shaft 26. Engine 10 has an axis of symmetry 30 extending from an inlet side 32 of engine 10 aftward to an exhaust side 34 of engine 10. Shafts 24 and 26 rotate about axis of symmetry 30. In one embodiment, engine 10 is an F110 engine available from General Electric Aircraft Engines, Cincinnati, Ohio.

In operation, air flows through low pressure compressor 12 from an inlet side 32 of engine 10 and compressed air is supplied from low pressure compressor 12 to high pressure compressor 14. Compressed air is then delivered to combustor 16 and airflow from combustor 16 drives turbines 18 and 20.

Figure 2:
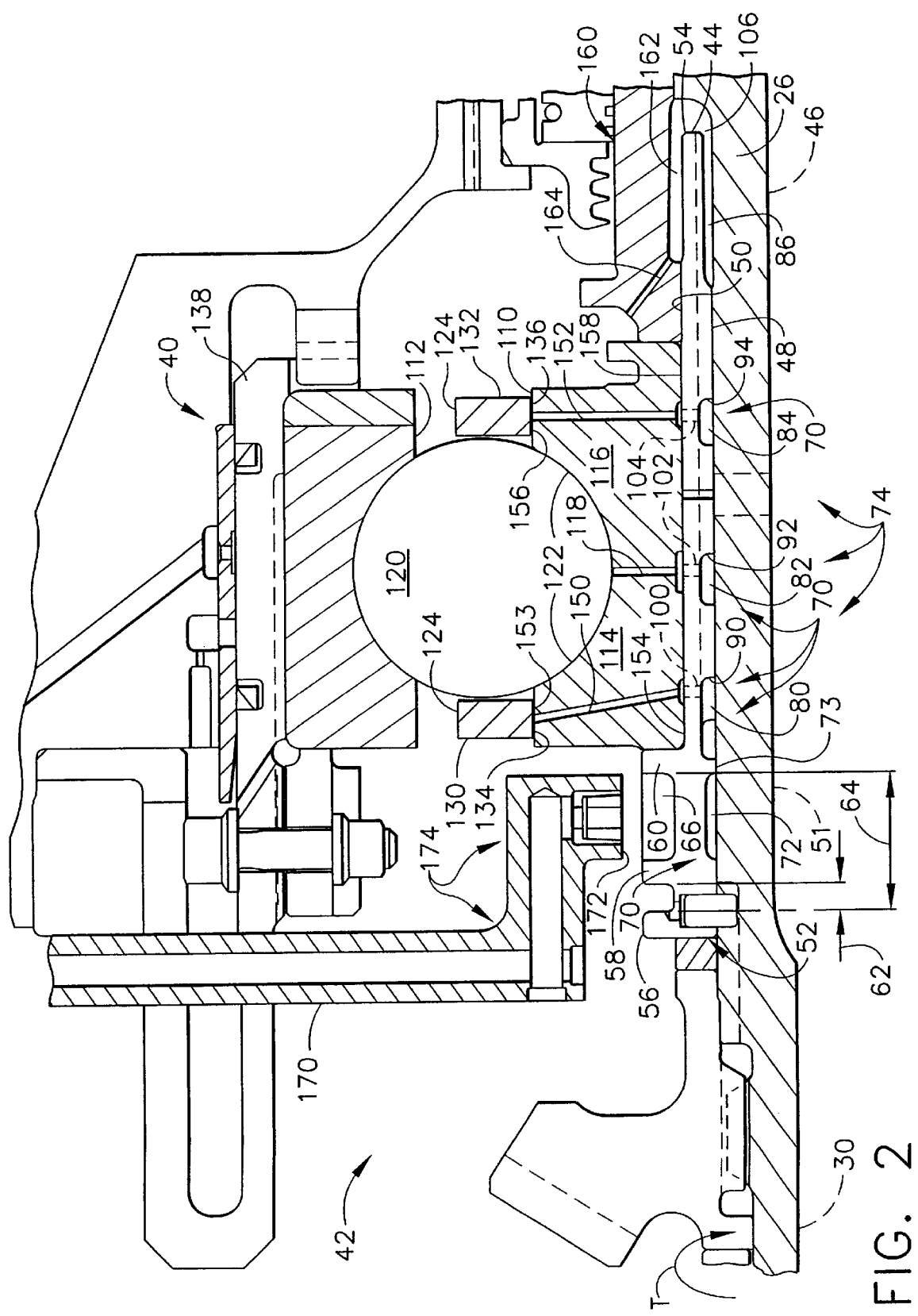
FIG. 2 is a side cross-sectional schematic illustration of a bearing assembly and bearing lubrication system included in the gas turbine engine shown in FIG. 1.

FIG. 2 is a side cross-sectional schematic illustration of an exemplary embodiment of a bearing assembly 40 and bearing lubrication system 42 included in gas turbine engine 10. Bearing assembly 40 is rotatably coupled to main shaft 26 with a rotor shaft 44. Main shaft 26 transmits torque T from a compressor (not shown in FIG. 2), such as high pressure compressor 14 (shown in FIG. 1), and a turbine (not shown in FIG. 2), such as high pressure turbine 18 (shown in FIG. 1). Main shaft 26 includes an axis of symmetry 46 that is coincident with engine axis of symmetry 30.

Rotor shaft 44 is rotatably coupled to main shaft 26 and receives torque T transmitted by shaft 26. Furthermore, rotor shaft 44 is sized to fit radially outward and circumferentially around shaft 26 with a conventional interference fit. More specifically, rotor shaft 44 includes an inner surface 48 and an outer surface 50. Rotor shaft 44 includes an axis of symmetry 51 that is coincident with main shaft axis of symmetry 46.

Rotor shaft 44 is substantially cylindrical and includes an upstream end 52 and a downstream end 54. A first shoulder 56 extends radially outward from rotor shaft 44 at upstream end 52 to provide structural support for rotor shaft 44. A mating second and third shoulder 58 and 60, respectively, extend radially outward from rotor shaft 44 and are an axial distance 62 and 64, respectively, aft of first shoulder 56. Shoulders 58 and 60 provide additional structural support for rotor shaft 44 to permit a plurality of lubrication system scoops 66 to extend between rotor shaft outer and inner surfaces 50 and 48, respectively.

Rotor shaft 44 also includes a plurality of lubrication system grooves 70 extending within rotor shaft inner surface 48. A first lubrication system groove 72 extends circumferentially within a portion of an inner circumference (not shown in FIG. 2) of rotor shaft inner surface 48. First groove 72 is the end trap of radial oil scoop 66 and extends substantially perpendicular to rotor shaft axis of symmetry 51. A diameter 73 is in an interference fit with shaft 26 and extends circumferentially within a lesser portion of the inner circumference of rotor shaft inner surface 48 then groove 72. Diameter 73 is known as an equalizer dam. A set 74 of grooves 70 extend axially aftward from first groove 72. Specifically, a second, a third, a fourth, and a fifth axial groove 80, 82, 84, and 86, respectively, extend axially aftward from first groove 72 and are included in set 74. In one embodiment, rotor shaft 44 includes a plurality of substantially similar groove sets 74 spaced circumferentially within rotor shaft inner surface 48, wherein each set 74 includes four grooves 70. In another embodiment, rotor shaft 44 includes a plurality of sets (not shown) spaced circumferentially within rotor shaft inner surface 48, wherein each of the sets includes a different quantity of grooves 70. In a further embodiment, rotor shaft 44 includes a plurality of sets (not shown) spaced circumferentially within rotor shaft inner surface 48, wherein each individual set includes grooves 70 that are sized differently than every other circumferentially spaced set of grooves 70.

A trailing end 90, 92, and 94 of each axial groove 80, 82, and 84, respectively, includes an opening 100, 102, and 104, respectively. Each opening 100, 102, and 104 extends between each axial groove 80, 82, and 84, respectively, and rotor shaft outer surface SO. Axial groove 86 extends from a second groove to rotor shaft downstream end 54 such that a trailing end 108 of axial groove 86 is coincident with rotor shaft downstream end 54.

A plurality of bearing assemblies 40 are coupled circumferentially around rotor shaft 26 to support rotor shaft 26. Each bearing assembly 40 includes an inner race 110 and an outer race 112. Each inner race 110 is rotatably coupled through rotor shaft 44 to rotor shaft 26. In one embodiment, inner race 110 is a split bearing race and includes a first half 114 and a second half 116. Inner race first and second halves 114 and 116, are butted together at a radial plane or center splitline 118.

A plurality of bearing elements 120 extend circumferentially around inner races 110 and are in rolling contact with a contoured inner surface 122 of each inner race half 114 and 116. Each bearing element 120 is also in rolling contact with each bearing outer race 112. In one embodiment, bearing elements 120 are ball bearings. An annular bearing cage 124 is radially outward from each inner race half 114 and 116 and extends circumferentially around each bearing element 120 to maintain a predetermined circumferential spacing between adjacent bearing elements 120.

Cage 124 includes a forward end 130 and an aft end 132. Cage forward end 130 is radially outward from and in contact with an inner race first half shoulder 134 and cage aft end 132 is radially outward from and in contact with an inner race second half shoulder 136. Shoulders 134 and 136 extend from inner race contoured inner surfaces 122 forward and aftward, respectively, and each is substantially parallel to rotor shaft axis of symmetry 51.

A plurality of stationary bearing outer races 112 extend circumferentially around each bearing element 120 such that each bearing element 120 is in rolling contact between each bearing outer race 112 and each mating bearing inner race 110. An annular bearing support 138 attaches to each bearing outer race 112 to secure each bearing assembly 40 within engine 10.

Each inner race half 114 and 116 includes a plurality of radial openings 150 and 152, respectively, extending between rotor shaft inner and outer surfaces 48 and 50, respectively. Inner race first half radial opening 150 extends between an outer surface 153 of inner race shoulder 134 and an inner surface 154 of inner race first half 114 such that cage forward end 130 is in flow communication with first axial groove 80. Inner race second half radial opening 152 extends between an outer surface 156 of inner race shoulder 136 and an inner surface 158 of inner race second half 116 such that cage aft end 132 is in flow communication with first axial groove 84. Inner race center splitline radial grooves 118 extend between inner race inner surfaces 154 and 158 and inner race contoured inner surface 122 such that bearing element 120 is in flow communication with second axial groove 82.

A bearing seal assembly 160 is downstream from bearing assembly 40 and radially outward from rotor shaft downstream end 54. Seal assembly 160 includes a groove 162 and a plurality of radial openings 164. Groove 162 extends from rotor shaft downstream end 54 to splitline openings 164 such that rotor shaft fourth axial groove 86 is in flow communication with radial opening 164 and seal assembly 160.

In the exemplary embodiment, lubrication system 40 includes lubrication system grooves 70 and a lubrication nozzle 170. Nozzle 170 extends radially inward towards engine axis of symmetry 30 and includes a discharge 172. Nozzle 170 is in flow communication with a lubricating oil supply source (not shown). In one embodiment, nozzle 170 includes a plurality of bends 174. Bends 174 permit nozzle discharge 172 to be aligned radially outward from rotor shaft 44 between rotor shaft shoulders 60 and 58 such that the lubrication system scoops are in flow communication with nozzle discharge 172 and may capture oil exiting from nozzle 170.

Figure 3:
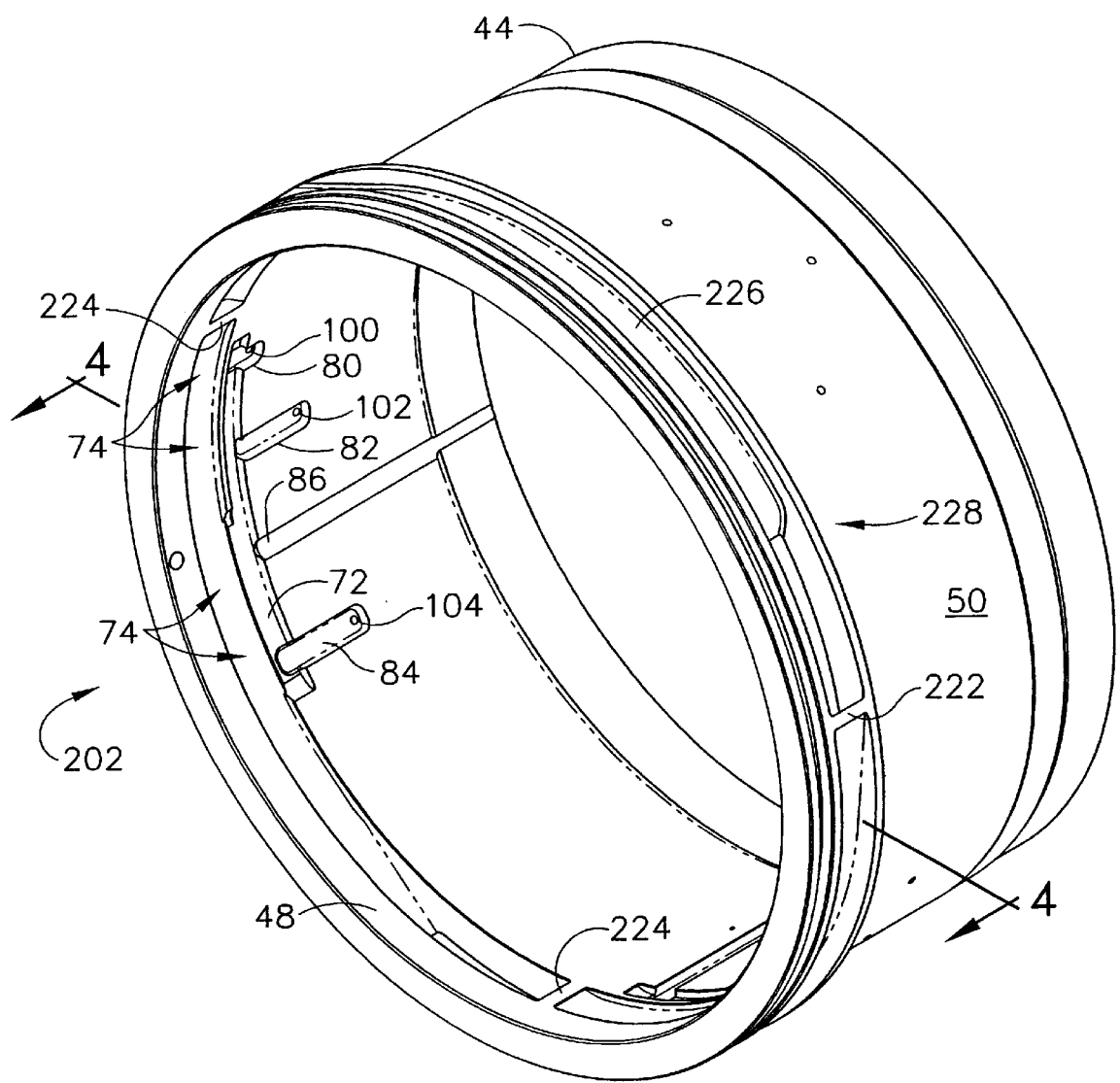
FIG. 3 is perspective view of a portion of a rotor shaft used with the bearing lubrication system shown in FIG. 2.
Figure 4:
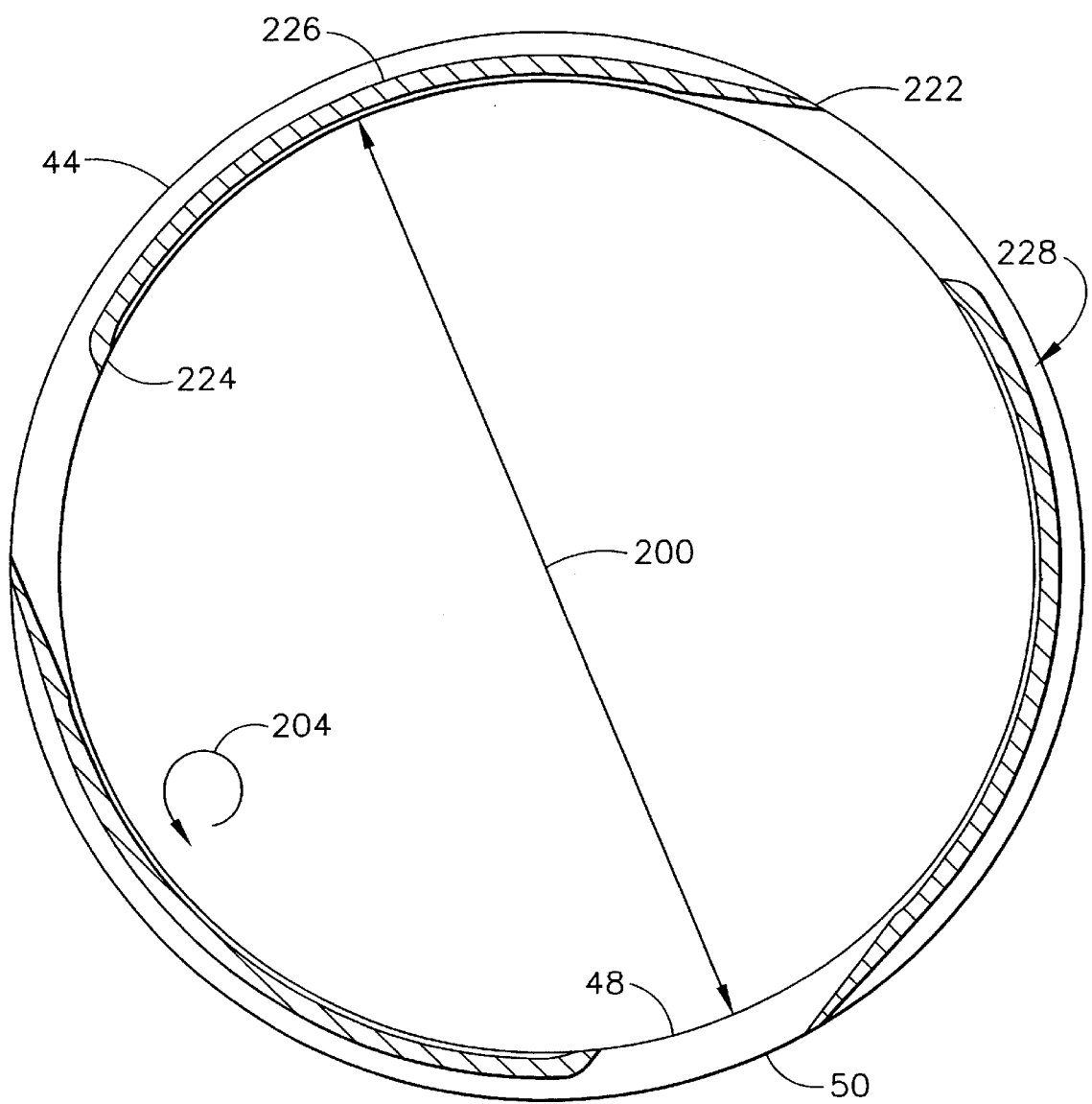
FIG. 4 is a cross-sectional view of the rotor shaft shown in FIG. 3 taken along line 4—4.

FIG. 3 is perspective view of a portion of rotor shaft 44 and FIG. 4 is a cross-sectional view of rotor shaft 44 taken along line 44 shown in FIG. 3. Rotor shaft 44 is substantially cylindrical and has an inner diameter 200 measured with respect to inner surface 48. Inner diameter 200 is sized to fit around main rotor shaft 26 (shown in FIGS. 1 and 2) with an interference fit. Inner surface 48 includes lubrication system first groove 72 and groove set 74. First groove 72 extends over a portion 202 of an inner circumference 204 defined by rotor shaft inner surface 48. In one embodiment, rotor shaft inner surface 48 includes four first grooves 72 spaced circumferentially around inner surface 48.

Set 74 includes grooves 80, 82, 84, and 86 having various axial lengths and extending axially aftward from first groove 72. Each groove 80, 82, and 84 includes opening 100, 102, and 104, respectively. Openings 100, 102, and 104 each have a diameter (not shown) sized to deliver an amount of oil flowing from each groove 80, 82, and 84, respectively.

Each first groove 72 is in flow communication with a lubrication system scoop 66 to receive oil from lubrication system nozzle 170 (shown in FIG. 2). Each scoop 66 includes an entrance 222, an exit 224, and a channel 226 extending therebetween. Each entrance 222 is within rotor shaft outer surface 50 and each exit 224 is within rotor shaft inner surface 48. Channels 226 are tapered and extend circumferentially between each exit 224 and each entrance 222 through a portion 228 of rotor shaft 44. In one embodiment, rotor shaft 44 includes four lubrication system scoops 66 spaced circumferentially around each rotor shaft 44.

During operation, lubricating oil is supplied through nozzle 170 (shown in FIG. 2) and directed from nozzle discharge 172 towards rotor shaft 44. Specifically, lubricating oil is directed radially inward towards rotor shaft lubrication scoops 66. Oil is captured with each scoop 66 and forced circumferentially through scoop channels 226 radially inward towards main shaft 26 (shown in FIG. 1). The oil exits scoop channel exits 224 and is directed into lubrication system first groove or equalizer dam 72. Equalizer dam 72 permits oil to circumferentially collect to provide an even distribution of oil to each axial groove 80, 82, 84, and 86.

Axial groove 80 supplies lubricating oil through inner race radial opening 150 (shown in FIG. 2) to cage forward end 130 and axial groove 82 supplies lubricating oil through inner race center splitline radial groove 118 (shown in FIG. 2) to bearing element 120 (shown in FIG. 2). Axial groove 84 supplies lubricating oil through inner race radial opening 152 (shown in FIG. 2) to cage aft end 132. Axial groove 86 supplies lubricating oil to bearing seal assembly 160. As a result of equalizer dam 73, oil is evenly distributed between axial grooves 80, 82, 84, and 86, rather than oil being forced disproportionately through an axial groove located closest to scoop exit 224.

The above-described lubrication system is cost-effective and highly reliable. The lubrication system includes a plurality of first grooves extending circumferentially and a plurality of second grooves extending axially from the first groove and in flow communication with the bearing assembly. Because the first groove permits lubricating oil to initially flow circumferentially prior to the oil flowing axially, the oil is evenly distributed between each of the axial grooves. As a result, the bearing assembly receives a more even distribution of lubricating oil and bearing wear is reduced. Thus, because the lubrication system permits the bearing assembly to operate with higher efficiency and lower wear, the bearing assembly useful life is extended.

While the invention has been described in terms of various specific embodiments, those skilled in the art will recognize that the invention can be practiced with modification within the spirit and scope of the claims.

What is claimed is:

1. A method for lubricating a bearing assembly using a lubrication system, the bearing assembly supporting a first rotor shaft having an axis of symmetry, the lubrication system including a second rotor shaft mounted concentrically around the first rotor shaft and including an inner surface and an outer surface, the inner surface including a plurality of first grooves extending axially from at least one second groove, the second groove substantially perpendicular to the plurality of first grooves, the first grooves in flow communication with the bearing assembly, said method comprising the steps of:

supplying oil to at least one second rotor shaft second groove, channeling the oil circumferentially along a portion of an inner circumference of the second rotor shaft;

channeling the oil from the second rotor shaft second groove through the plurality of second rotor shaft first grooves; and channeling the oil from at least one second rotor shaft first groove to the bearing assembly through at least one opening that extends between the second rotor shaft inner and outer surfaces.

2. A method in accordance with claim 1 wherein the second rotor shaft further includes a plurality of scoops extending between the second rotor shaft inner and outer surfaces, said step of supplying oil to at least one second rotor shaft second groove further comprising the step of supplying oil through a plurality of scoops to the second rotor shaft second groove.

3. A method in accordance with claim 1 wherein each of the second rotor shaft inner surface first grooves includes an opening extending between the second rotor shaft inner and outer surfaces, said step of channeling oil from the second rotor shaft second groove further comprising the step of channeling oil from the second rotor shaft second grooves through each of the second rotor shaft second groove openings to the bearing assembly.

4. A method in accordance with claim 1 wherein the second rotor shaft inner surface further includes a plurality of second grooves spaced circumferentially around the first rotor shaft, said step of supplying oil further comprising the step of supplying oil to the plurality of second rotor shaft plurality of second grooves.

5. A method in accordance with claim 1 wherein said step of supplying oil further comprises the step of supplying oil to the second rotor shaft through a nozzle.

6. A lubrication system for a gas turbine engine including a first rotor shaft and an axis of symmetry, said lubrication system comprising a second rotor shaft concentrically around said first rotor shaft, said second rotor shaft comprising an inner surface and an outer surface, said inner surface comprising a plurality of first grooves and at least one second groove, said plurality of first grooves in flow communication with and extending axially from said at least one second groove, said at least one second groove substantially perpendicular to said plurality of first grooves and extending partially circumferentially through said inner surface, at least one of said plurality of first grooves comprising an opening extending between said second rotor shaft inner surface and said second rotor shaft outer surface.

7. A lubrication system in accordance with claim 6 further comprising a nozzle, said second rotor shaft further comprising a plurality of scoops extending between said second rotor shaft outer surface and said second rotor shaft inner shaft, said plurality of scoops in flow communication with said at least one second groove and configured to receive fluid from said lubrication system nozzle.

8. A lubrication system in accordance with claim 7 wherein said plurality of scoops spaced are circumferentially around the first rotor shaft.

9. A lubrication system in accordance with claim 7 wherein said second rotor shaft inner surface comprises an inner circumference, said at least one second groove extends through a portion of said inner circumference.

10. A lubrication system in accordance with claim 7 wherein each of said plurality of first grooves comprises at least one opening extending between said second rotor shaft inner surface and said second rotor shaft outer surface.

11. A lubrication system in accordance with claim 6 wherein said second rotor shaft inner surface further comprises a plurality of second grooves spaced evenly and circumferentially around the first rotor shaft.

12. A lubrication system in accordance with claim 11 wherein said second rotor shaft further comprises a plurality of scoops extending from said second rotor shaft outer surface to said second rotor shaft inner surface, each of said plurality of second grooves in flow communication with one of said plurality of scoops.

13. A lubrication system in accordance with claim 6 wherein each of said first grooves is in further flow communication with a bearing assembly.

14. A gas turbine engine comprising:
a first rotor shaft comprising an outer surface and an axis of symmetry;
a bearing assembly configured to support said first rotor shaft; and
a lubrication system comprising a second rotor shaft concentrically around said first rotor shaft such that said second rotor shaft rotates simultaneously with said first rotor shaft, said second rotor shaft comprising an inner surface and an outer surface, said inner surface comprising a plurality of first grooves and at least one second groove, said plurality of first grooves in flow communication with and extending axially from said at least one second groove, said at least one second groove substantially perpendicular to said plurality of first grooves and extending partially circumferentially around said inner surface, said lubrication system configured to supply lubricate said bearing assembly, said at least one second groove comprising an opening extending between said second rotor shaft inner and outer surfaces.

15. A gas turbine engine in accordance with claim 14 wherein said lubrication system further comprises a nozzle, said lubrication system second rotor shaft further comprises a plurality of scoops extending between said second rotor shaft outer surface and said second rotor shaft inner surface, said plurality of scoops in flow communication with said at least one second groove and configured to receive fluid from said nozzle.

16. A lubrication system in accordance with claim 15 wherein said second rotor shaft plurality of scoops are spaced circumferentially around said first rotor shaft.

17. A lubrication system in accordance with claim 16 wherein said second shaft inner surface further comprises a plurality of second grooves spaced circumferentially around said first rotor shaft, each of said second grooves in flow communication with one of said plurality of scoops.

18. A lubrication system in accordance with claim 15 wherein each of said second rotor shaft second grooves comprises an opening extending between said second rotor shaft inner surface and said second rotor shaft outer surface.

19. A lubrication system in accordance with claim 18 wherein each of said second rotor shaft second groove openings is in flow communication with said bearing assembly.

20. A lubrication system in accordance with claim 18 wherein each of said second rotor shaft second groove openings is in flow communication with said nozzle and said bearing assembly.

* * * * *